United States Patent
Yamamoto

[11] Patent Number: 5,375,686
[45] Date of Patent: Dec. 27, 1994

[54] DEVICE FOR CONTROLLING HYDRAULIC STEERING CLUTCH AND BRAKE

[75] Inventor: Yukyu Yamamoto, Komatsu, Japan

[73] Assignee: Kabushiki Kaisha Komatsu Seisakusho, Tokyo, Japan

[21] Appl. No.: 975,559
[22] PCT Filed: Jul. 26, 1991
[86] PCT No.: PCT/JP91/01008
  § 371 Date: Feb. 22, 1993
  § 102(e) Date: Feb. 23, 1993
[87] PCT Pub. No.: WO92/03327
  PCT Pub. Date: Mar. 5, 1992

[30] Foreign Application Priority Data

Aug. 23, 1990 [JP] Japan ................................. 2-88293

[51] Int. Cl.⁵ .................... B62D 11/08; F16D 67/04
[52] U.S. Cl. ................... 192/13 R; 192/12 C; 91/521; 91/524; 180/6.2
[58] Field of Search .............. 192/12 C, 13 R; 180/6.2, 6.7; 91/521, 523, 524

[56] References Cited

U.S. PATENT DOCUMENTS

| | | | |
|---|---|---|---|
| 2,438,389 | 3/1948 | Edge | 91/521 |
| 2,615,542 | 10/1952 | Le Tourneau | 192/13 R X |
| 2,817,427 | 12/1957 | Clark et al. | 192/13 R |
| 2,975,851 | 3/1961 | Youmans et al. | 180/6.2 |
| 3,460,645 | 8/1969 | Brown et al. | 192/13 R |
| 3,747,472 | 7/1973 | Knutson | 91/524 X |
| 3,830,438 | 6/1974 | Kobelt | 91/524 X |
| 5,235,811 | 8/1993 | Arii et al. | 91/521 X |

FOREIGN PATENT DOCUMENTS 62-110075 7/1987 Japan.

Primary Examiner—Richard M. Lorence
Attorney, Agent, or Firm—Richards, Medlock & Andrews

[57] ABSTRACT

A device for controlling hydraulic steering clutches and brakes in a crawler vehicle such as a bulldozer has a simple structure so as to be manipulated by a monolever. The device comprises a single steering lever (5), four proportional pressure control valves (1), (2), (3), (4), left and right steering clutch pistons (7), (7a) and left and right brake cylinders (8), (8a). The four valves are composed of two sets of valves, one set of two valves for steering clutches, in which the timing of the rise of hydraulic pressure is earlier, and one set of two valves for brakes, in which the timing of the rise of hydraulic pressure is later than the former.

5 Claims, 2 Drawing Sheets

DEVICE FOR CONTROLLING HYDRAULIC STEERING CLUTCH AND BRAKE

FIELD OF THE INVENTION

The present invention relates to a device for controlling hydraulic steering clutches and brakes used for a crawler vehicle such as a bulldozer.

BACKGROUND OF THE INVENTION

The structures of hydraulic steering clutches and brakes will be explained with reference to FIG. 4. In an actual vehicle, left and right clutches and brakes in pairs are mounted on an axle 9. However, only those on the left side are exemplified in this figure.

During normal advance, the steering clutch 10 is turned on while the brake 11 is turned off so that a power from an input shaft 12 is transmitted to a left output shaft 13 by way of the axle 9 and the left steering clutch 10, and accordingly, a drive sprocket 14 is driven.

In the case of steering, when for example a left steering lever 15 is pulled back from its neutral position, the operation of a hydraulic control valve 17 is started through the intermediary of a link 16, and accordingly, oil from a pump 6 flows into a left clutch piston 7 at a position intermediate of a stroke so that the left steering clutch 10 is turned off.

Thus, the power on the axle is transmitted only to a right output shaft while a left output shaft 13 falls into a free condition, thereby the bulldozer turns moderately to the left.

From this condition, when the left steering lever 15 is pulled further, oil flows also into a left brake cylinder 8 by way of the hydraulic control valve 17 so that the left brake 11 is turned on through the intermediary of a link 18, and accordingly, the left output shaft 13 is made to be stationary, thereby the bulldozer turns sharply to the left.

Incidentally, when a brake pedal 19 is depressed, the left and right brakes are turned on through the intermediary of a link 20, and accordingly, braking is performed in a straight travel condition.

However, such a conventional control device inevitably uses a large size hydraulic control valve which is therefore disposed in an extra space in the vehicle body and which is coupled to the steering lever through a linkage. Accordingly, the structure is complicated, resulting in an increase in manufacturing cost.

Further, in order to enhance the steering ability in a monolever system which is manipulated by a single lever, it is necessary to arrange left and right hydraulic control valves in the vicinity of the steering lever. However, such an arrangement has been difficult for the conventional large size control valve.

The present invention is devised in order to solve the above-mentioned problems inherent to the conventional arrangement, and accordingly, one object of the present invention is to provide a device for controlling hydraulic steering clutches and brakes, which is simple in its structure and which can be manipulated by a monolever.

DISCLOSURE OF THE INVENTION

A device for controlling hydraulic clutches and brakes, according to the present invention, is composed of a single steering lever, four proportional pressure control valves manipulated by the steering lever, and left and right steering clutch pistons and left and right brake cylinders which are connected to the output ports of the proportional pressure control valves by means of conduits.

These four proportional pressure control valves consist of two sets of valves: one set of two proportional pressure control valves for steering clutches, in which the timing of the rise of hydraulic pressure is earlier, and one set of two proportional pressure control valves for brakes, in which the timing of the rise of hydraulic pressure is later than the former.

At first, when the steering lever is tilted, the proportional pressure control valves for steering clutches are operated so as to move the steering clutch pistons to turn off the clutches, accordingly, a moderate turn is performed. When the steering lever is further tilted, the proportional pressure control valves for the brakes are operated to actuate the brake cylinders, and accordingly, braking is effected, thereby a sharp turn is performed. With this arrangement, the steering with the use of a monolever can be made while having functions substantially the same as those of the conventional control valve.

BEST CONFIGURATION FOR CARRYING OUT THE INVENTION

Explanation will be made of an embodiment of a device for controlling steering clutches and brakes, according to the present invention, with reference to the drawings.

Figure 1:
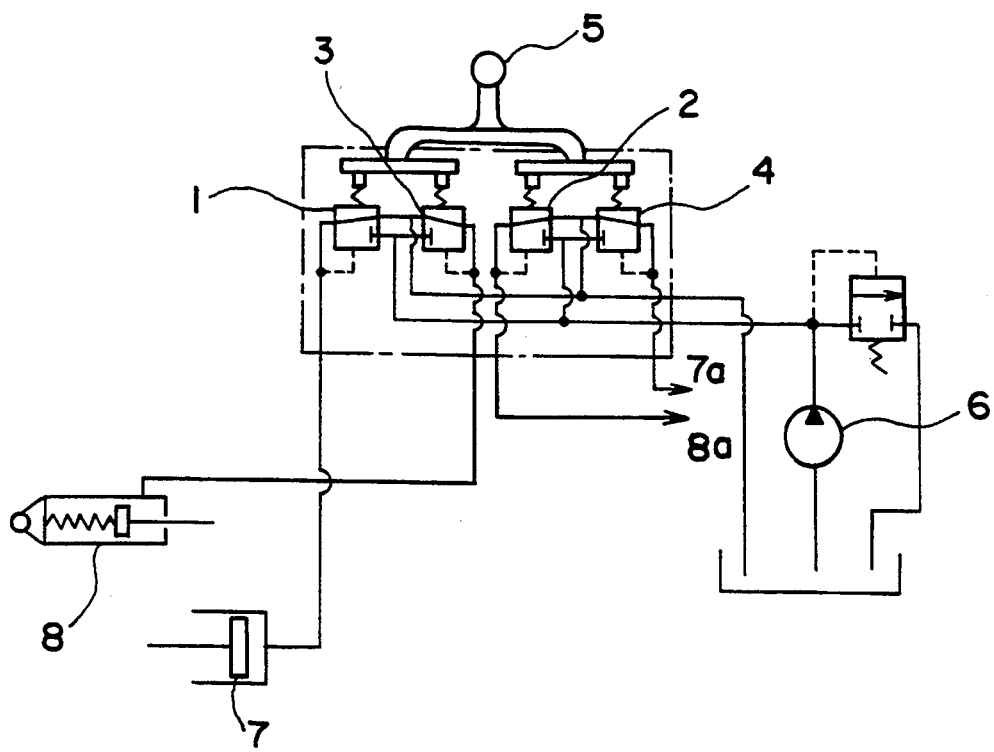
FIG. 1 is an explanatory view illustrating an essential part of a device for controlling steering clutches and brakes, according to the present invention.
Figure 2:
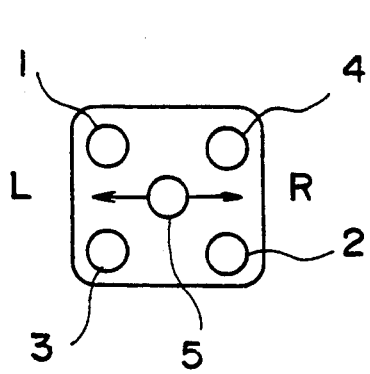
FIG. 2 is a plan view illustrating an arrangement of pressure control valves.

FIG. 1 is an explanatory view illustrating an essential part of the device for controlling steering clutches and brakes, and FIG. 2 is a plan view illustrating an arrangement of proportional pressure control valves.

Four proportional pressure control valves 1, 2, 3, 4, arranged as shown in FIG. 2, are mechanically linked to a single steering lever 5, and their inlet ports are connected to a hydraulic pump 6 while their outlet ports are connected respectively to left and right clutch pistons 7, 7a and brake cylinders 8, 8a by means of conduits.

Figure 3:
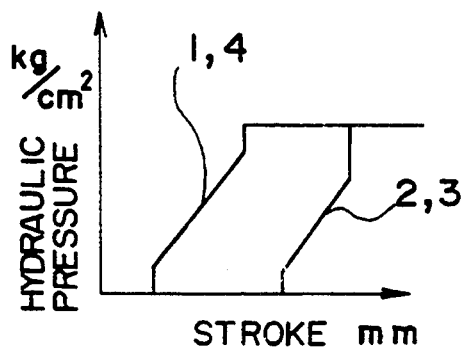
FIG. 3 is a graph showing the relationship between the stroke and the hydraulic pressure of the proportional pressure control valve.
Figure 4:
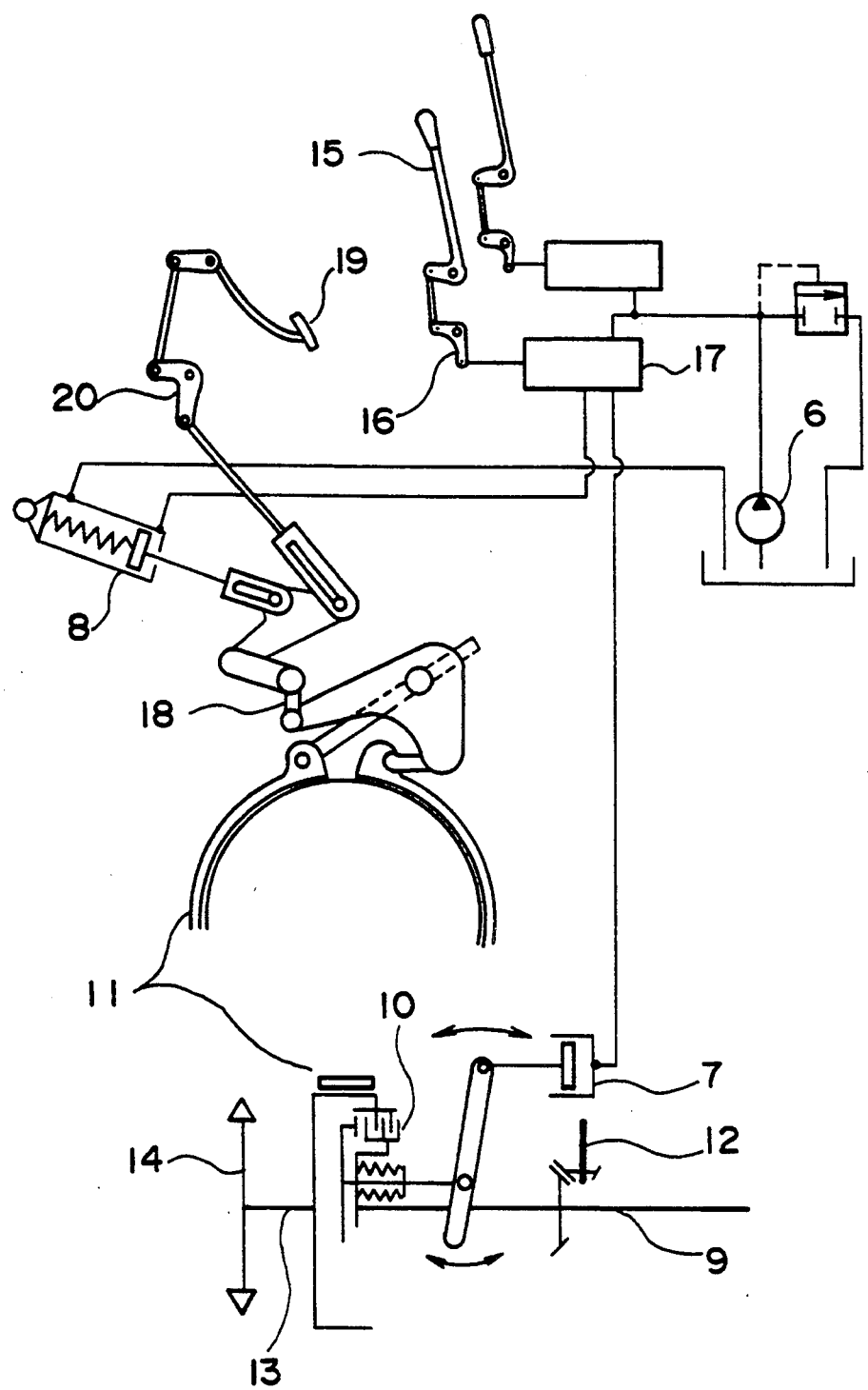
FIG. 4 is an explanatory view illustrating a conventional device for controlling steering clutches and brakes.

The four proportional pressure control valves 1, 2, 3, consist of two groups: one group including two proportional pressure control valves 1, 4 for steering clutches, and the other group including two proportional pressure control valves 2, 3 for brakes. Further, these valves are arranged so as to exhibit such a hydraulic characteristic that the timing of the rise of hydraulic pressure of the proportional pressure control valves 1, 4 for steering clutches is earlier that of the proportional pressure control valves 2, 3 for brakes as shown in FIG. 3.

In such a hydraulic control device, when the steering lever 5 is tilted to the left in the direction of the arrow L, the proportional pressure control valve 1 for a steering clutch is at first operated so that oil flows into the left clutch piston 7, and accordingly, a left steering clutch 10 is turned off, thereby a vehicle turns moderately to the left. When the steering lever 5 is tilted further to the left, the proportional pressure control valve 3 for a brake is operated so that oil flows into the left brake cylinder 8, and accordingly a left brake 11 is turned on, thereby the vehicle turns sharply to the left.

When the steering lever 5 is tilted to the right in the direction of the arrow R, the proportional pressure control valve 4 for a steering clutch is operated so that oil flows into the right clutch piston 7a, thereby the vehicle turns moderately to the right, similar to that mentioned above. When the steering lever is tilted further to the right, the proportional control valve 2 for a brake is operated so that oil flows into the right brake cylinder 8a, thereby the vehicle turns sharply to the right, similar to that mentioned above.

It is noted that the proportional pressure control valves, which are in general use for controlling pilot pressures of main control valves, are used in this embodiment for directly controlling actuators such as pistons so as to reduce the manufacturing cost. Accordingly, if the hydraulic pressure lacks due to internal loss or the like in the proportional pressure control valves, the setting pressure of the hydraulic pump 6 is boosted up for compensation.

The control device as mentioned above, uses small size proportional pressure control valves, and accordingly, it is possible to facilitate the use of a monolever system, thereby the steering ability can be enhanced.

Further, different from a method of using proportional pressure control valves in general, actuators are driven directly by proportional pressure control valves without using main control valves, and accordingly, the necessity of intermediate links and the like can be eliminated, and thereby it is possible to reduce the cost.

INDUSTRIAL APPLICABILITY

The present invention is effectively used for a device for controlling hydraulic steering clutches and brakes used in a crawler vehicle such as a bulldozer, and in particular, the structure thereof is simple so that it is effectively used as a control device which can be manipulated by a monolever.

What is claimed is:

1. A device for controlling hydraulic left and right steering clutches and left and right brakes in a hydraulic steering device mounted on an axle of a crawler vehicle and adapted to hydraulically turn on and turn off a steering clutch, characterized by a single steering lever, four proportional pressure control valves mechanically manipulated by said single steering lever, and left and right steering clutch pistons and left and right brake cylinders connected respectively to outlet ports of said proportional pressure control valves through the intermediary of conduits, wherein said four proportional pressure control valves are composed of two sets, one set of two proportional pressure control valves for said left and right steering clutch pistons, in which the timing of the rise of hydraulic pressure is earlier, and one set of two proportional pressure control valves for said left and right brake cylinders, in which the timing of the rise of hydraulic pressure is later than that of the former, the proportional pressure control valve for said left steering clutch piston and the proportional pressure control valve for said left brake cylinder being positioned with respect to the single steering lever so as to be actuated by tilting of the single steering lever to the left, and the proportional pressure control valve for said right steering clutch piston and the proportional pressure control valve for said right brake cylinder being positioned with respect to the single steering lever so as to be actuated by tilting of the single steering lever to the right, with the four proportional pressure control valves being arranged with respect to the single steering lever so that a degree of tilting of the single steering lever required for an operation of a pressure control valve to provide a rise of hydraulic pressure to a brake cylinder is greater than a degree of tilting of the single steering lever required for an operation of a pressure control valve to provide a rise of hydraulic pressure to a steering clutch piston.

2. A device in accordance with claim 1 wherein each of said proportional pressure control valves is connected directly by a respective conduit to a respective one of said left steering clutch piston, said right steering clutch piston, said left brake cylinder, and said right brake cylinder so as to provide direct control thereof.

3. A device for controlling hydraulic left and right steering clutches and left and right brakes in a hydraulic steering device mounted on an axle of a crawler vehicle, characterized by a single steering lever, four proportional pressure control valves mechanically manipulated by said single steering lever, and left and right steering clutch pistons and left and right brake cylinders connected respectively to outlet ports of said proportional pressure control valves through the intermediary of conduits, wherein said four proportional pressure control valves constitute a left steering valve, a left brake valve, a right steering valve, and a right brake valve, and wherein said single lever is associated with said four proportional pressure control valves such that a degree of tilting of the single steering lever required for an operation of a pressure control valve to provide a rise of hydraulic pressure to a brake cylinder is greater than a degree of tilting of the single steering lever required for an operation of a pressure control valve to provide a rise of hydraulic pressure to a steering clutch piston so that a tilting of said lever in a left direction first operates the proportional pressure control valve connected to said left steering clutch piston to effect a moderate turn to the left and a further tilting of said single lever in the left direction operates the proportional pressure control valve connected to said left brake cylinder to effect a sharper turn to the left, while a tilting of said lever in a right direction first operates the proportional pressure control valve connected to said right steering clutch piston to effect a moderate turn to the right and a further tilting of said single lever in the right direction operates the proportional pressure control valve connected to said right brake cylinder to effect a sharper turn to the right.

4. A device in accordance with claim 3 wherein each of said proportional pressure control valves is connected directly by a respective conduit to a respective one of said left steering clutch piston, said right steering clutch piston, said left brake cylinder, and said right brake cylinder so as to provide direct control thereof.

5. Apparatus in accordance with claim 4, wherein the proportional pressure control valves connected to one of said left steering clutch piston and said right steering clutch piston form a first set of proportional pressure control valves and wherein the proportional pressure control valves connected to one of said left brake cylinder and said right brake cylinder form a second set of proportional pressure control valves, wherein the timing of the rise of hydraulic pressure is earlier in said first set than in said second set.

* * * * *

UNITED STATES PATENT AND TRADEMARK OFFICE
CERTIFICATE OF CORRECTION

PATENT NO. : 5,375,686

DATED : December 27, 1994

INVENTOR(S) : Yukyu YAMAMOTO

It is certified that error appears in the above-indentified patent and that said Letters Patent is hereby corrected as shown below:

Title page, Item [86] § 102(e) Date: delete "Feb. 23, 1993" and insert --Feb. 22, 1993--.

Signed and Sealed this

Seventh Day of March, 1995

Attest:

Attesting Officer

BRUCE LEHMAN

Commissioner of Patents and Trademarks